United States Patent [19]
Ohga et al.

[11] Patent Number: 6,041,025
[45] Date of Patent: Mar. 21, 2000

[54] DATA DISK INCLUDING SUPPLEMENTARY INFORMATION ENABLING RETRIEVAL OF RELATED INFORMATION FROM ANOTHER STORAGE MEDIUM

[75] Inventors: Norio Ohga; Yoshitaka Ukita, both of Tokyo, Japan

[73] Assignee: Sony Corporation, Tokyo, Japan

[21] Appl. No.: 08/906,702

[22] Filed: Aug. 6, 1997

Related U.S. Application Data

[62] Division of application No. 08/691,334, Aug. 2, 1996, Pat. No. 5,930,208.

[30] Foreign Application Priority Data

Aug. 9, 1995 [JP] Japan .................................. 7-222753

[51] Int. Cl.[7] ........................................................ G09B 3/00
[52] U.S. Cl. ................... 369/30; 369/36; 434/317
[58] Field of Search ............................. 369/275.3, 275.1, 369/13, 116, 275.2, 30, 36, 38, 178, 97, 64, 125, 124, 112; 434/317, 308, 327, 319, 309

[56] References Cited

U.S. PATENT DOCUMENTS

| 4,570,250 | 2/1986 | Gabritsos et al. ........................ 369/97 |
| 4,941,125 | 7/1990 | Boyne ..................................... 364/900 |
| 4,974,178 | 11/1990 | Izeki et al. ............................... 364/523 |
| 5,010,417 | 4/1991 | Yoshio et al. ............................ 358/335 |
| 5,375,113 | 12/1994 | Pollard et al. ............................ 369/30 |
| 5,413,486 | 5/1995 | Burrows et al. ......................... 434/317 |
| 5,437,552 | 8/1995 | Baer et al. ............................... 434/317 |
| 5,466,158 | 11/1995 | Smith, III ................................ 434/317 |
| 5,515,347 | 5/1996 | Mulder et al. ............................ 369/30 |
| 5,539,658 | 7/1996 | McCullough ........................... 364/514 |
| 5,595,489 | 1/1997 | Kwon ..................................... 434/319 |

*Primary Examiner*—Ali Neyzari
*Attorney, Agent, or Firm*—Limbach & Limbach L.L.P.

[57] ABSTRACT

An information reproduction method uses a first storage medium and a second storage medium. For the method a plurality of pieces of information and retrieval information are recorded in one of the storage media. The retrieval information is used to retrieve and reproduce the pieces of information with a reproduction apparatus, and information related to the information recorded in the first storage medium is recorded on a plurality of pieces of paper as the second storage medium. At first the pieces of information recorded in the first storage medium loaded in the reproduction apparatus are retrieved based on the retrieval information recorded in the first storage medium, subsequently the information retrieved from the first storage medium as output are displayed, and the information recorded in the second storage medium is retrieved based on the displayed information representing the location of the information recorded in the second storage medium related thereto.

5 Claims, 6 Drawing Sheets

| KEY WORD | ADDRESS ON DISK | LOCATION IN BOOK |
|---|---|---|
| A B C | $A_9$, $A_{178}$, $A_{250}$ | PAGE 6, LINE 3, 8TH CHARACTER; PAGE 28, LINE 10, 2ND CHARACTER |
| D E | $A_{35}$, $A_{6001}$ | PAGE 89, LINE 16, 15TH CHARACTER; PAGE 170, LINE 1, 1ST CHARACTER |
| F G H | $A_{571}$, $A_{5023}$, | PAGE 34, LINE 7, 9TH CHARACTER |

DATA DISK INCLUDING SUPPLEMENTARY INFORMATION ENABLING RETRIEVAL OF RELATED INFORMATION FROM ANOTHER STORAGE MEDIUM

This is a divisional of application Ser. No. 08/691,334, filed Aug. 2, 1996 now U.S. Pat. No. 5,930,208.

BACKGROUND OF THE INVENTION

1. Field of the Invention

This invention generally relates to an information reproduction method using a plurality of storage media, and a data disk. In particular, this invention relates to an information reproduction method using a plurality of storage media in which pieces of information mutually related are recorded, and a disk used therefor.

2. Description of the Related Art

Although books and newspapers are dominant in information media, the amount of information recorded in such paper media is limited. Accordingly, to increase the amount of information and the efficiency of retrieval, media represented by CD-ROMs in which information is electronically recorded have been widely used. In fact, dictionaries and novels are published in the form of CD-ROMs.

However, when displaying a photograph, a graph or a table from disk-shaped recording media (e.g. optical disks) in which a large amount of information can be recorded, it is impossible to always display such an image clearly because the image quality including definition and colors and the display size are limited by the performance of the display.

To enhance the image quality, a large-size display having high performance needs to be used in a reproduction apparatus. This reproduction apparatus using such a display cannot readily be used by ordinary users, and lacks portability.

Although the paper media are superior to disk-shaped recording media in the performance of displaying images and photographs, the amount of information recorded in the former is less than that of the latter. For example, the amount of information recorded in one CD-ROM corresponds to that of information contained in one very thick book. Such a paper medium is inconvenient because it lacks portability. As the amount of information increases in the paper media, retrieval becomes extremely difficult.

SUMMARY OF THE INVENTION

It is therefore an object of the present invention to provide an information reproduction method using a plurality of storage media, which resolves the above-mentioned problems.

It is another object of the present invention to provide a data disk which resolves the above-mentioned problems.

According to the present invention, there is provided an information reproduction method using a plurality of storage media, in which a plurality of pieces of information and retrieval information therefor are recorded in one of the storage media, the retrieval information being used to retrieve and reproduce the pieces of information with a reproduction apparatus, and information related to the information recorded in the one storage medium is recorded on a plurality of pieces of paper as the other storage medium, the method comprising the steps of: retrieving the pieces of information recorded in the one storage medium loaded in the reproduction apparatus, based on the retrieval information recorded in the one storage medium; outputting the information retrieved from the one storage medium; and retrieving the information recorded in the other storage medium, based on the output information representing the location of the information recorded in the other storage medium related thereto.

According to the present invention, there is provided an information reproduction method using a plurality of storage media, in which a plurality of pieces of information and retrieval information therefor are recorded in one of the storage media, the retrieval information being used to retrieve and reproduce the pieces of information with a reproduction apparatus, and a plurality of pieces of information are recorded in a plurality of pieces of paper as the other storage means, both the pieces of information recorded in the one storage medium and the other storage medium being mutually related, the method comprising the steps of: retrieving the pieces of information recorded in the one storage medium, based on supplementary information which is included the retrieval information and shows that pieces of the information recorded in the other storage medium are related to pieces of the information recorded in the one storage means, and outputting the information retrieved from the one storage medium.

According to the present invention, there is provided a data disk including: article data having at least character information; supplementary information provided in the article data, representing the location at which image information related to the article data is recorded in the other storage medium; and index information for retrieving the article data.

DESCRIPTION OF THE PREFERRED EMBODIMENTS

By referring to the attached drawings, an information reproduction method using a plurality of storage media, and a disk in accordance with the present invention will be described in detail, below.

In the following embodiments, an optical disk in which data is recorded based on the CD-ROM format is used as one of the plurality of storage media, and a paper medium in the form of a book is used as the other storage media.

Both the configuration of a reproduction apparatus for an optical disk and the directory structure of the optical disk will be described.

Figure 1:
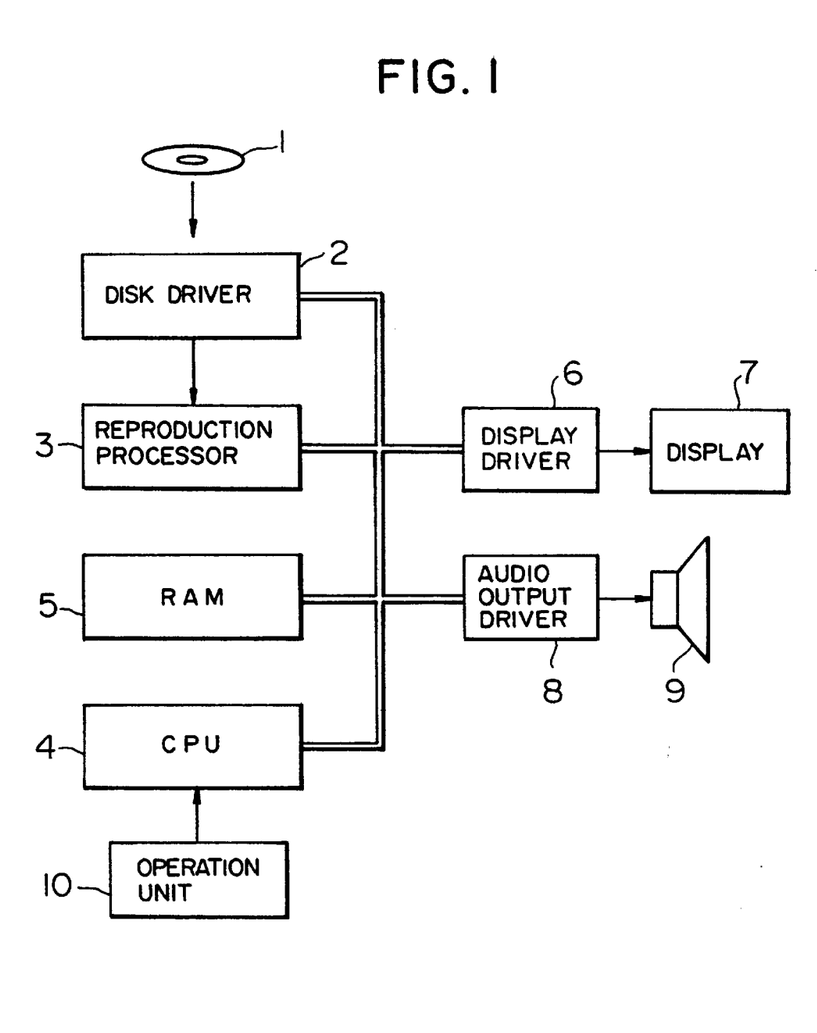
FIG. 1 is a block diagram of a reproduction apparatus in accordance with an embodiment of the present invention.

In FIG. 1 showing a block diagram of the reproduction apparatus, an optical disk 1 is loaded in a disk drive 2. The disk drive 2 has a spindle mechanism for revolving the disk 1 at a predetermined velocity, e.g., a constant linear velocity, an optical head for reading information recorded in the disk 1 by detecting rays reflected from the disk 1 on which a laser beam is irradiated, and servomechanisms for performing various operations in connection with the spindle mechanism and the optical head.

Data read from the disk 1 by the optical head in the disk drive 2 is supplied to a reproduction processor 3. The reproduction processor 3 executes decode processing at various stages to output information such as character information, image information, and audio information. The output information from the reproduction processor 3 is stored in a random access memory (RAM) 5 in which writing and reading operations are controlled. With the control of a central processing unit (CPU) 4, information is read from the RAM 5 based on an input from an operation unit 10 as described below, and data to be displayed in the information, namely, character or image information read from the RAM 5 are supplied to a display driver 6. The display driver 6 displays on a display 7 in accordance with the character or image information supplied. The CPU 4 includes a microcomputer.

Audio information in the information read from the RAM 5 is supplied to an audio output driver 8, in which the information is converted from digital to analog and amplified. The resulting information is supplied in the form of an analog audio signal to a speaker 9, so that the information is outputted as a sound therefrom.

The operation unit 10 is provided with a plurality of different types of operation keys for commanding the operation of reproduction for the optical disk 1. The plurality of different types of operation keys include, for example, not only input keys for commanding the basic operations of playback and stop, but also a ten-key pad, alphabetical keys and an enter key. Retrieval information is inputted by using theses types of keys. For example, in connection with desired information in the optical disk 1, a clue such as a data number, a key word, or initial characters is inputted. The CPU 4 traces the directories of information in the optical disk 1 by the data inputted from the operation unit 10, and finds the address of the information to be read in the disk 1. The disk drive 2 is directed so that the data at the address is read by using the optical head. The operation unit 10 is further provided with other types of necessary keys such as a power switch. The CPU 4 controls the operations of the disk drive 2, the reproduction processor 3, the RAM 5, the display, driver 6, and the audio output driver 8, based on operation data inputted from the operation unit 10.

Figure 2:
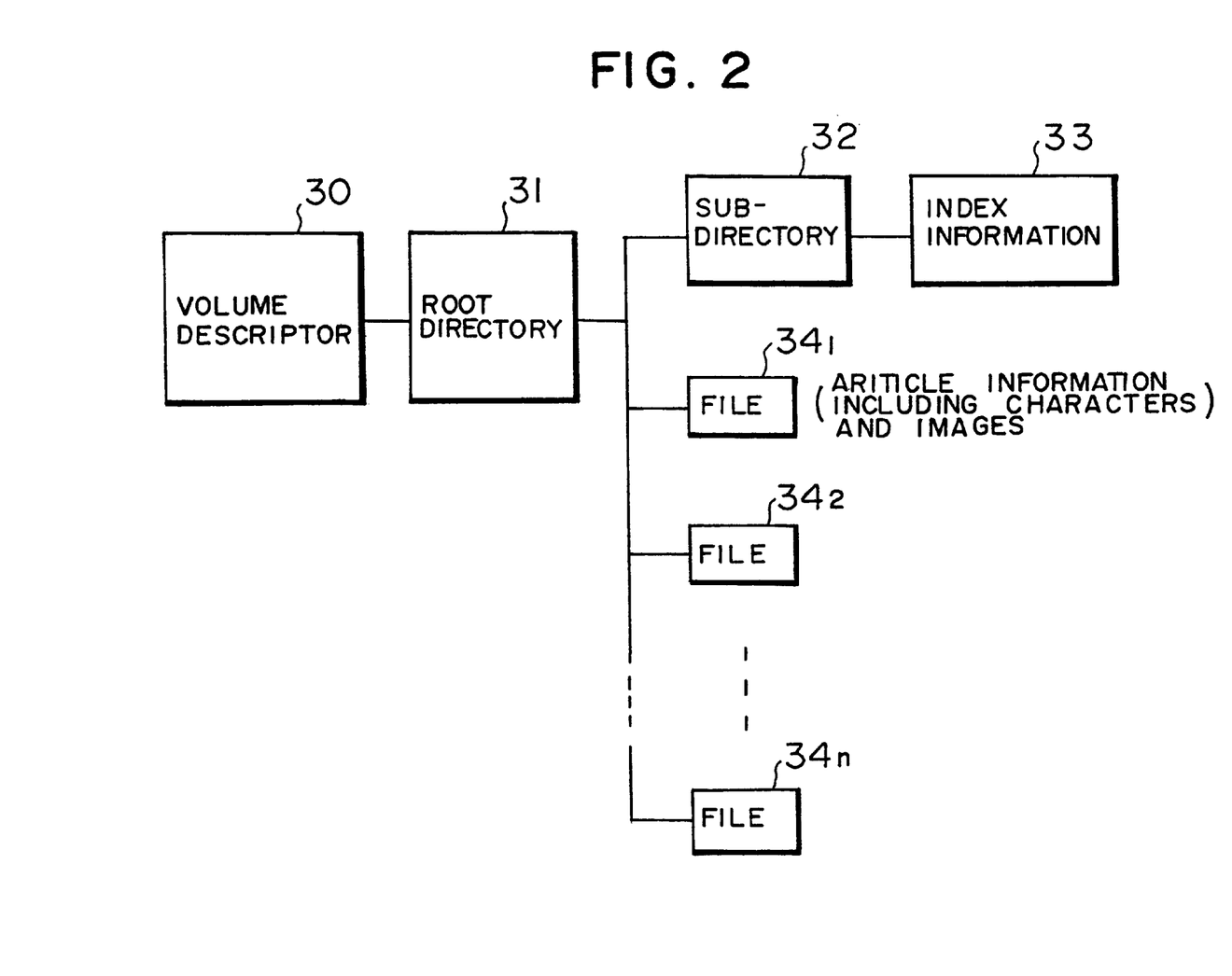
FIG. 2 is a block diagram showing the configuration of directories in an optical disk in the embodiment of the present invention.

In FIG. 2 there is shown the configuration of directories in the optical disk 1. In the disk 1, character, figures, and other information is basically recorded based on the CD-ROM format. When audio information is additionally recorded, the CD-ROM XA (CD-ROM extended architecture) format is used.

Data serving as a volume descriptor 30 is recorded on the innermost circumference of the optical disk 1.

The volume descriptor 30 includes basic data regarding the contents of information recorded in the optical disk 1, such as the title and author, and the logical structure information of the whole disk information, such as the address at which the root directory 31 is recorded.

In the root directory 31, the addresses of a sub-directory 32 and files $34_1, 34_2, \ldots, 34n$ are recorded.

The files $34_1, 34_2, \ldots, 34n$ correspond to one document, and mean a group of data representing information, such as audio information as well as character and image information, which are the contents of the document. The number of files created in the optical disk 1 and a method of separating files depending on the contents of data are determined in accordance with the contents of the information when the disk 1 is designed as a kind of software.

The sub-directory 32 includes addresses at which index information 33 is recorded. The index information 33 is used for retrieving the contents of the information in the optical disk 1.

As the index information 33, data used for various types of retrieval are recorded. The following techniques can be used: forward matching retrieval (retrieval performed by inputting the initial character or first characters of a word), backward matching retrieval (retrieval performed by inputting the last character or backward characters of a word), keyword retrieval, menu retrieval, and data number retrieval. The index information 33 includes information required for performing these types of retrieval. For example, for keyword retrieval, the address at which the keyword is actually recorded is included. For data number retrieval, in accordance with the number assigned to each information, the address of the information is recorded. The detailed configuration of data recorded in the optical disk 1 is disclosed in Japanese Patent Application No. 2-5325, and U.S. patent application Ser. No. 07/640105 filed on Jan. 11, 1991 corresponding thereto.

In this embodiment the optical disk 1 is used as one of storage media. Information can be read from the disk 1 by the reproduction apparatus as shown in FIG. 1. On the other hand, a book is used as the other one of storage media whose contents correspond to those of the disk 1.

The contents to be included in this book correspond to the contents of various types of information in the optical disk 1 so that they complement each other. For example, when an explanation of a thing is recorded in the disk 1, a photograph, a figure, and so forth that relate to the explanation are included in the book. Thereby, a piece of information obtained from one of storage media enables easy access to information related thereto from the other storage medium.

In FIGS. 3A to 6B there are shown such a configuration of information between the two storage media of the optical disk 1 and the book.

Figure 3A:
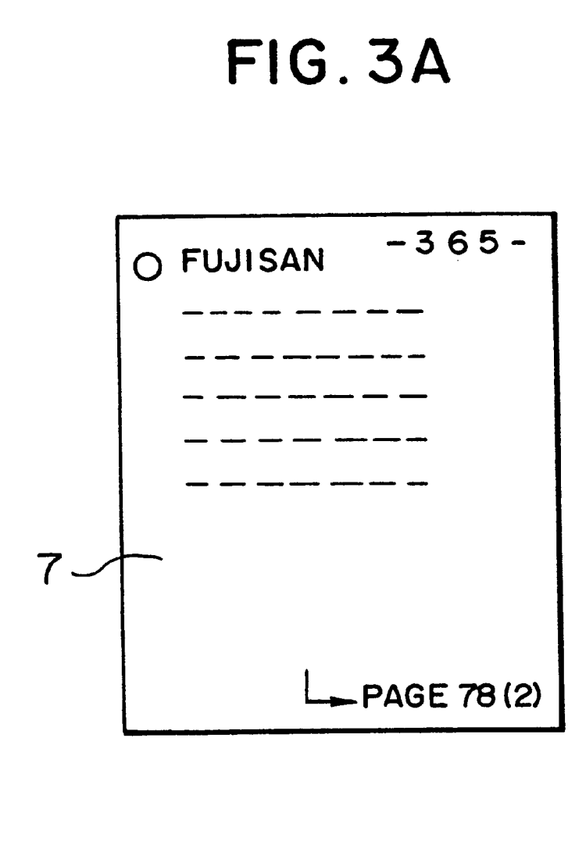
FIGS. 3A and 3B are explanatory charts illustrating data for the mutual retrieval in another embodiment of the present invention.

With the optical disk 1 loaded in the reproduction apparatus as shown in FIG. 1, information on "Fujisan" is retrieved using the predetermined technique as described above. As a result, a file on "Fujisan" read from the disk 1 is displayed by the display 7, as shown in FIG. 3A. This displayed information on "Fujisan" includes an introduction and an explanation, and supplementary information as the location information of the page number of the book as it is shown in FIG. 3A.

Such supplementary information including the page numbers corresponding to the article numbers in the book is recorded in the optical disk 1, in addition to information to be included in the contents of the respective files in the disk 1. A piece of the supplementary information is displayed by the display 7 when the information of each file is read from the disk 1. For example, the display of "PAGE 78 (2)" shown in FIG. 3A allows the user to open a book 20 at page 78, article 2. At this page a photograph of Fujisan appears as shown in FIG. 3B.

On the other hand, when the book 20 is firstly opened, a data number of "365" appears at the top right corner of the page having the photograph of Fujisan. Accordingly, by inputting the data number 365 from the operation unit 10 for retrieval, the data on Fujisan read from the disk 1 by using the disk drive 2, as shown in FIG. 3A, is displayed on the display 7.

In place of the data number added to data such as photographs and figures appearing at the page of the book 20, for example, a keyword may be used. Consequently, it is required that the book 20 include information making it possible to retrieve information related thereto from the optical disk 1.

Figure 3B:
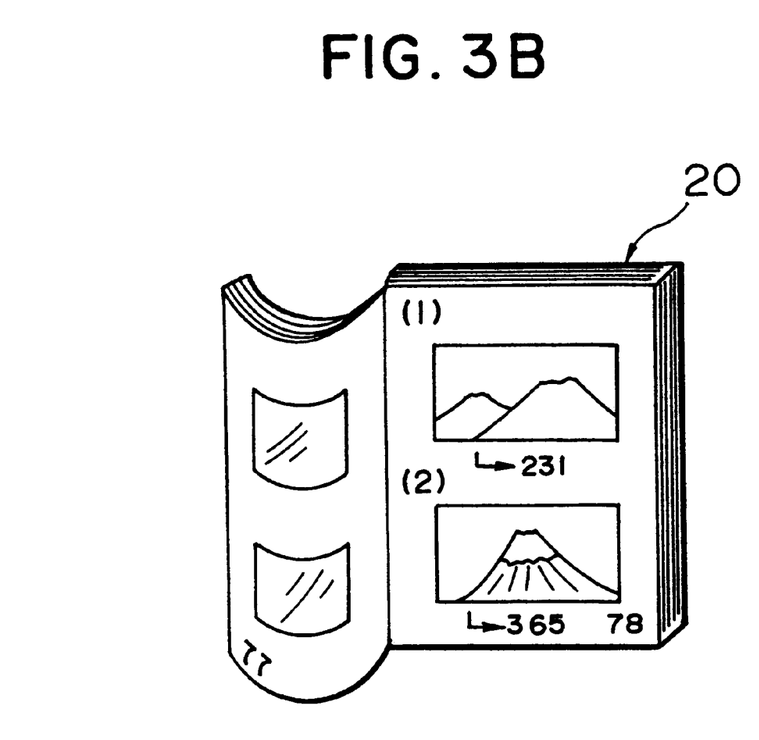

In FIGS. 3A and 3B, the information of the page number and article number of the book 20 are recorded in the optical disk 1, as part of the contents of information in the disk 1. However, a location at which information appears in the book 20 may be recorded, as data in index information.

Figure 4:
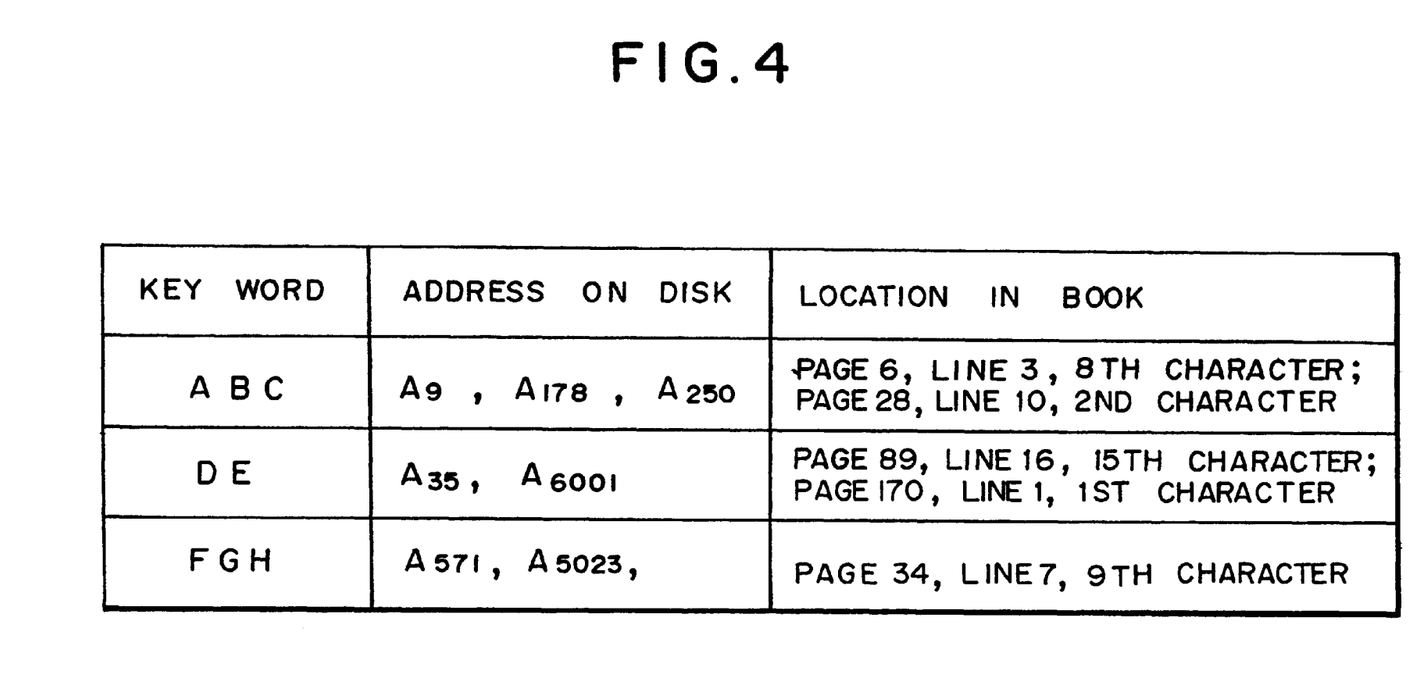
FIG. 4 is a table showing data for the mutual retrieval in still another embodiment of the present invention.

As shown in FIG. 4, the locations at which pieces of information appear in the book 20 are recorded in the optical disk 1, corresponding to the respective keywords.

The addresses at which pieces of information are recorded in the optical disk 1, corresponding to the keywords, are recorded in the disk 1. In addition, locations at which pieces of relevant information appear in the book 20 are recorded in the disk 1, the information including a page number, a line number, and a character position. When retrieval of information recorded in the disk 1 has been completed based on the keyword, the location at which a piece of information appears in the book 20 as well as the retrieved information may be simultaneously displayed on the display 7. Otherwise, book retrieval is performed by inputting a keyword to display a list of the locations at which pieces of information appear in the book 20. This is a mode in which the disk 1 is used as a keyword index for the book 20.

Figure 5A:
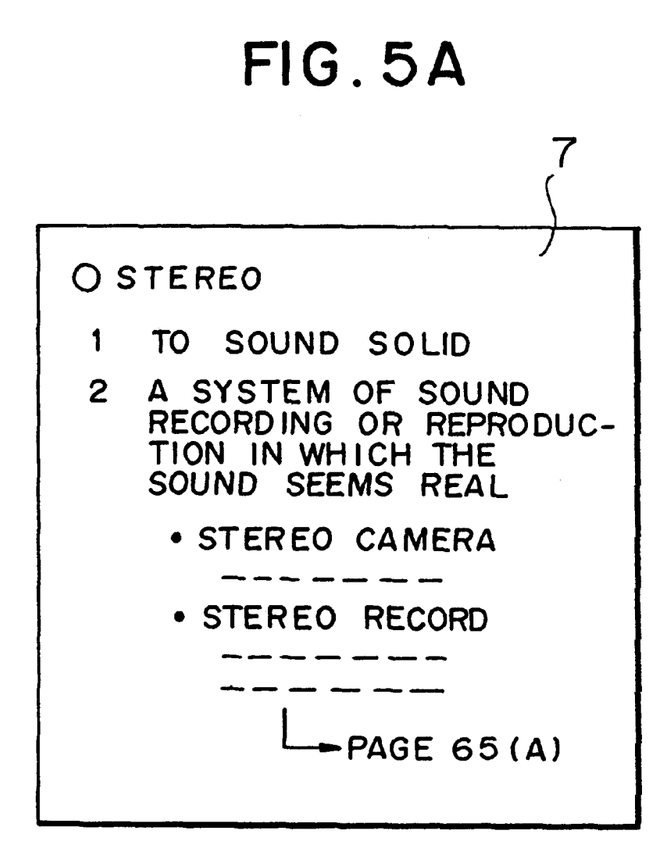
FIGS. 5A and 5B are explanatory charts illustrating data for the mutual retrieval in a further embodiment of the present invention.
Figure 5B:
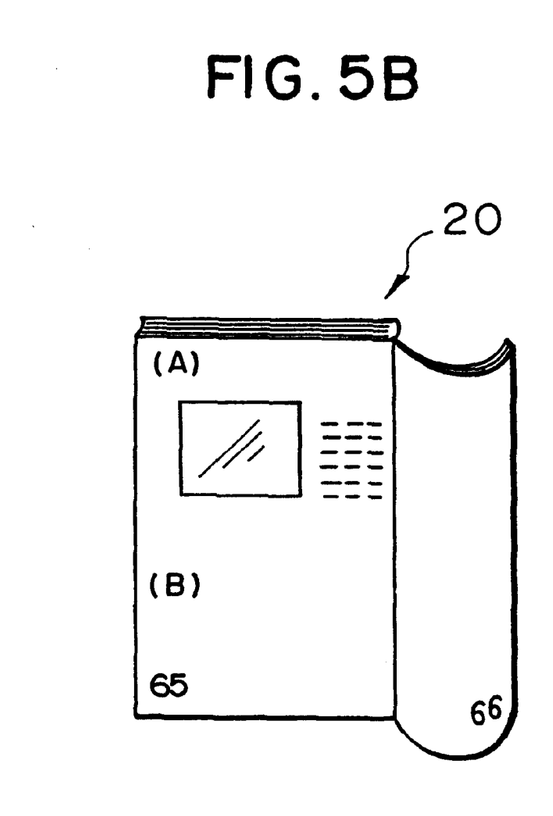

By referring to FIGS. 5A and 5B, while information recorded in the optical disk 1 is being displayed, not only the location at which a piece of information appears in the book 20 but also a description of relevant information appearing in the book 20 are emphatically displayed.

As shown in FIG. 5A, when a piece of information is read from the optical disk 1, an item of the displayed information, having relevant information, is displayed with a modified font or color and/or characters indicated in reverse. For example, as shown in FIG. 5B, the article "stereo" includes the word "stereo record" whose characters are displayed in a different character font. The article further includes the information "PAGE 65 (A)" on the last line representing the location at which a piece of relevant information appears in the book 20.

In the case described above, the book 20 includes page 65 (A) at which a figure and an explanation on "stereo record" appear.

Figure 6A:
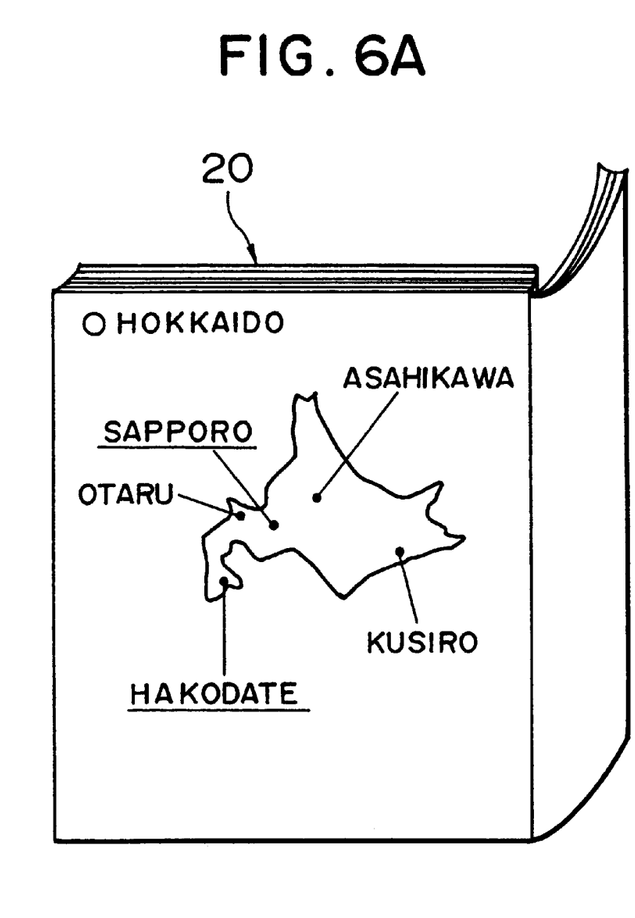
FIGS. 6A and 6B are explanatory charts illustrating data for the mutual retrieval in a still further embodiment of the present invention.
Figure 6B:
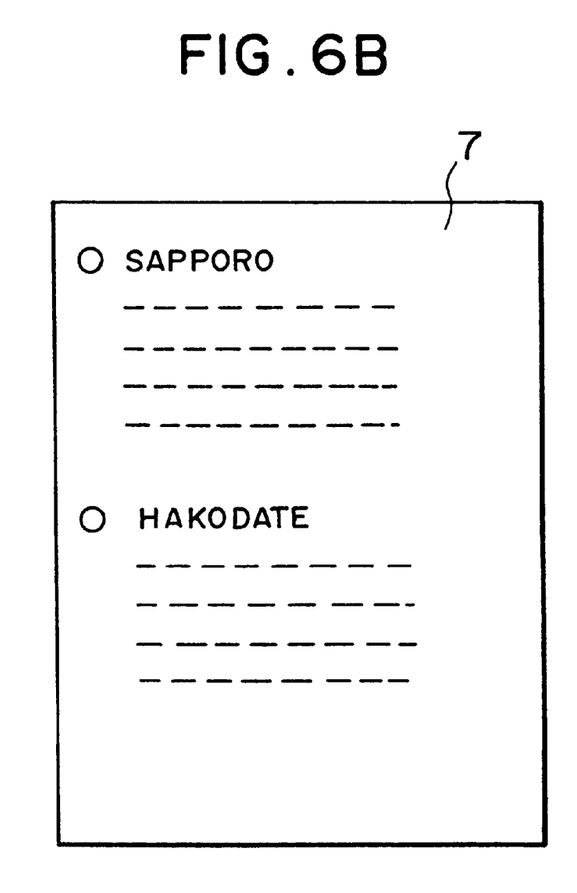

By referring to FIGS. 6A and 6B, unlike the case shown in FIGS. 5A and 5B, when a piece of information in the book 20 is found, the piece enables relevant information recorded in optical disk 1 to be displayed by the display 7. For example, as shown in FIG. 6A, a map of Hokkaido appears at a page in the book 20, and several place names are written at the page. Among these place names, place names that correspond to relevant information recorded in the disk 1 are written such that they are written in a form different from the form of the other place names using an underline or a different color.

In FIG. 6A, the place names "SAPPORO" and "HAKODATE" are underlined to represent relevant information recorded in the optical disk 1. In this case, the data numbers in the disk 1 may be additionally written. However, when the place names. "SAPPORO" and "HAKODATE" are recognized as they are keywords, they represent relevant information in the disk 1, and enable easy retrieval. In other words, inputting a keyword such as "SAPPORO" from the operation unit 10 enables retrieval of information recorded in the disk 1, and the results of the retrieval regarding "SAPPORO" can be displayed on the display 7.

As can be seen in FIGS. 5A and 5B, when the disk 1 has information relevant to information in the book 20, by showing the existence of the relevant information in the disk 1, the user is encouraged to access the disk 1 which serves as the other storage medium, and a variety of high quality information can be provided.

As described above, in accordance with the present invention, an optical disk as one storage medium and a book as the other medium are used so that pieces of information mutually related and complemented are recorded therein. By using these media, enormous character data requiring a great storage capacity is recorded in the optical disk, while images and photographs are contained in a book, thereby it is possible to increase the number of the forms of providing expression and information, and to remarkably enhance the quality of information to be provided.

In order to perform retrieval by readily combining pieces of information mutually related, information recorded in the optical disk includes the location at which relevant information appears in the book, and information appearing in the book includes pieces of relevant information recorded in the disk. In this manner, high quality information can be provided by easy retrieval using both media. As a result, advantageously, the usability of such information can be enhanced, and available information cannot be missed.

In the above embodiments, among a plurality of storage media the optical disk as one medium and the book as the other medium are used. However, as usable combinations, a combination of a medium that can send or receive data through a communication line and a book may be used, in addition to a combination of a magnetic disk and a book and a combination of a memory card including a semiconductor and a book.

Date read from the optical disk as one storage medium, as a result of retrieval, is outputted on the display in the embodiments, but may be outputted to a printer.

As can be seen from the foregoing, the present invention can be variously modified within the scope and spirit thereof.

What is claimed is:

1. An information reproduction system including an electronic storage medium and at least one paper storage medium, the information reproduction system including:

article data including character information and supplementary information recorded on the electronic storage medium, the supplementary information representing the location at which information related to said article data is recorded in the paper storage medium; and index information for retrieving said article data.

2. An information reproduction system according to claim 1, wherein the electronic storage medium is an optical data disk, and said article data and said supplementary information are recorded in the data disk, based on the CD-ROM format.

3. An information reproduction system according to claim 1, wherein the electronic storage medium is a magnetic storage data disk, and said article data and said supplementary information are recorded in the data disk in magnetic form.

4. An information reproduction system according to claim 1, wherein the paper storage medium comprises at least one of a photograph, a graph, and a table.

5. An information reproduction system according to claim 1, wherein the electronic storage medium comprises a semiconductor-type memory.

* * * * *